DEVICE FOR THE TRANSMISSION BY TELEPRINTER

Filed Sept. 5, 1967 6 Sheets-Sheet 1

INVENTOR
Jean CUVELIER
BY
Raymond A. [signature]
ATTORNEY

INVENTOR
Jean CUVELIER
BY
Raymond A. Robic
ATTORNEY

INVENTOR
Jean CUVELIER
BY
Raymond A. Robic
ATTORNEY

DEVICE FOR THE TRANSMISSION BY TELEPRINTER

Filed Sept. 5, 1967 6 Sheets-Sheet 4

INVENTOR
Jean CUVELIER
BY
Raymond A. Robic
ATTORNEY

DEVICE FOR THE TRANSMISSION BY TELEPRINTER

Filed Sept. 5, 1967 6 Sheets-Sheet 5

INVENTOR
Jean CUVELIER

BY
Raymond A. Bolin

ATTORNEY

DEVICE FOR THE TRANSMISSION BY TELEPRINTER

Filed Sept. 5, 1967

INVENTOR
Jean CUVELIER

BY

Raymond A. Robic
ATTORNEY

United States Patent Office 3,483,321

Patented Dec. 9, 1969

3,483,321

DEVICE FOR THE TRANSMISSION BY TELEPRINTER

Jean Cuvelier, Mont-sur-Marchienne, Belgium, assignor to Ateliers de Constructions Electriques de Charleroi (ACEC) Société Anonyme, Brussels, Belgium Filed Sept. 5, 1967, Ser. No. 665,406
Claims priority, application Belgium, Sept. 7, 1966, 686,528
Int. Cl. H041 17/00, 17/02
U.S. Cl. 178—26 10 Claims

ABSTRACT OF THE DISCLOSURE

A device for transmitting information in the form of pulse trains according to the international five-unit code wherein, for the purpose of transmission, the information is translated into a frequency code transmitted in two steps, said device comprising on the transmitting side a timing mechanism controlling dispatching gates and co-operating with two sets of memories connected via code translators to a transmitting equipment and on the receiving side a corresponding device including a selector, two translators and memories for storing the information, and a time mechanism controlling dispatching gates for reconstituting the original pulse trains.

It is already known to transmit information by means of telegraphic signals according to the international five-unit teleprinter code by transforming this code in a twelve-frequency transmission code transmitted in two steps, as regards the transmission, and, after reception, to reconstitute the information in the international five-unit code. Such a system is disclosed for instance in U.S. Patent No. 2,771,506 in which the telegraphic signals are recorded, at the transmission as well as at the reception, on perforated tapes according to the international five-unit code.

One object of the invention lies in the provision of a transmission device for teleprinter, independent of perforated tapes, and capable of transmitting according to the twelve-frequency code in the two steps, and information submitted in the form of pulse trains. More specifically, the object of the invention is a device that can be associated without changes to any pair of teleprinters adapted for communication by pulse trains.

A further object of the invention is to provide an electromagnetic wave transmission device for teleprinters, which, under all transmission conditions, is impervious to parasitics, even strong ones.

Another object is a transmission device of relatively small weight and volume.

The invention is characterized in the provision of a transmission device for teleprinters to transmit information in the form of pulse trains by transforming the same into a frequency code transmitted in two steps, comprising: a timing mechanism generating various timing pulses; a trigger circuit sensitive to the starting pulse of each pulse train representing a telegraphic sign adapted to cut in and to reset the timing mechanism; a plurality of dispatching gates connected to the incoming pulse train and controlled by the timing mechanism, the number of dispatching gates being the same as the number of significant pulses in said pulse train; first memories connected to the output of one part of the dispatching gate controlled by delayed timing pulses; second memories connected to the other part of the dispatching gate controlled by further delayed timing pulses; final memories controlled by still further delayed timing pulses connected to said first memories; first and second translators connected to said second memories and to said final memories respectively, at the output of said first and second translators appearing respectively one oscillation out of a first and one oscillation out of a second group of frequencies; and a mixing and output circuit connected to the output of said translators and adapted to feed a transmitting equipment.

The corresponding receiving equipment comprises: a receiving circuit adapted to receive oscillations into a predetermined range of frequencies; an oscillation selector connected to the receiving circuit having as many outputs as there are frequencies to be received; first and second translators each one connected to a different series of outputs of the oscillation selector; a timing mechanism generating various timing pulses; a triggering circuit connected to said second translator, sensitive to the recording of a frequency of the second translator and having outputs for cutting in said timing mechanism and having controlled inputs for being reset by timing pulses; first and second memories connected respectively to the outputs of said first and second translators and end memories connected to said first memories, said first memories being controlled by said triggering circuit and said second and end memories being controlled by timing pulses; a dispatching gate connected to each one of said second and end memories and controlled by appropriate timing pulses controlling the delivery time of the contents of said second and end memories; and an output circuit connected to the dispatching gates for reconstituting said pulse trains.

The invention is hereinafter explained in detail in relation to a preferred embodiment illustrated in the appended diagrams of the principle and operation as well as the appended diagrams of certain detailed circuits. In the drawing.

Figure 1:
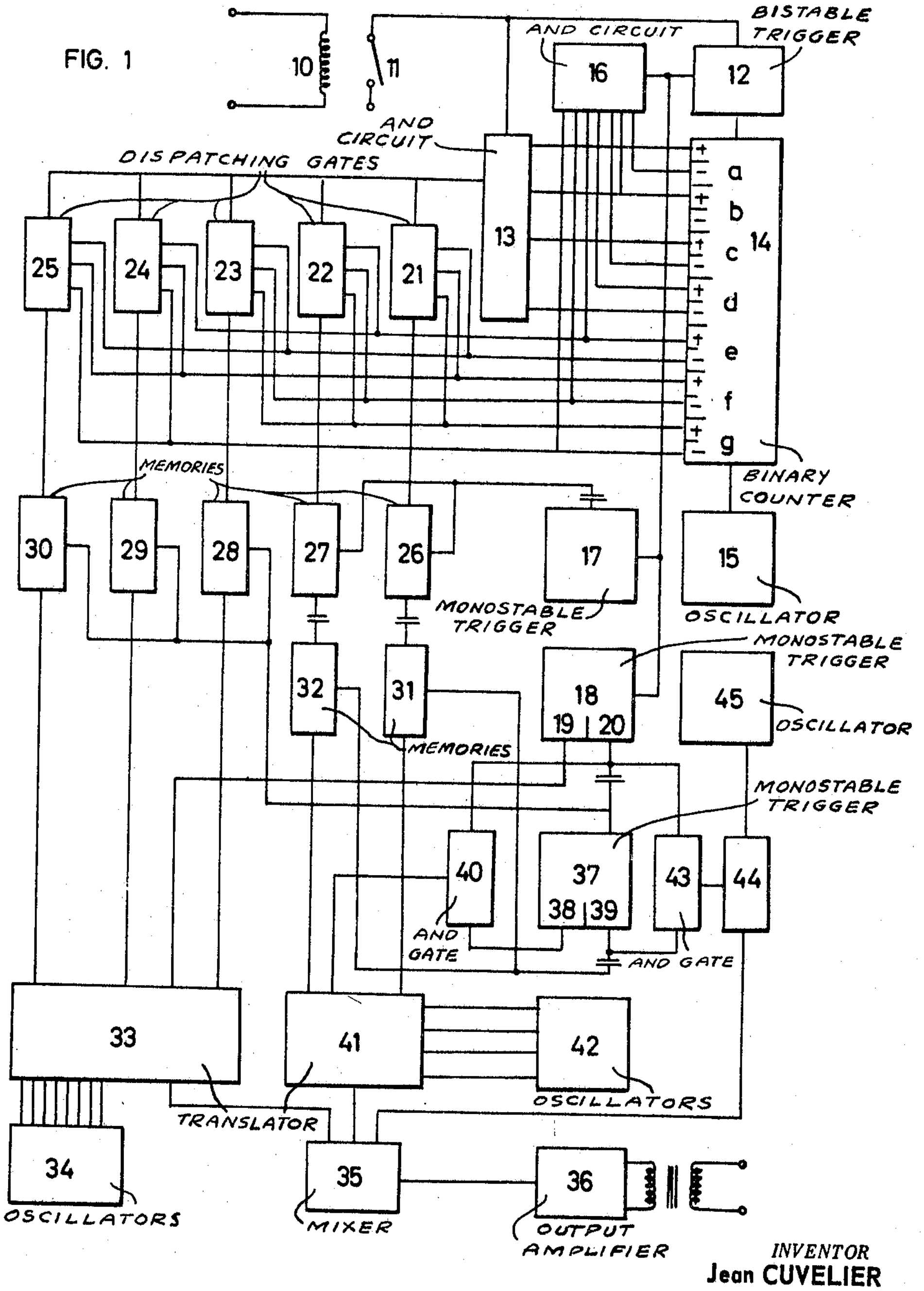
FIGURE 1 is a block diagram of the transmitting equipment illustrating the principle of the invention.
Figure 2:
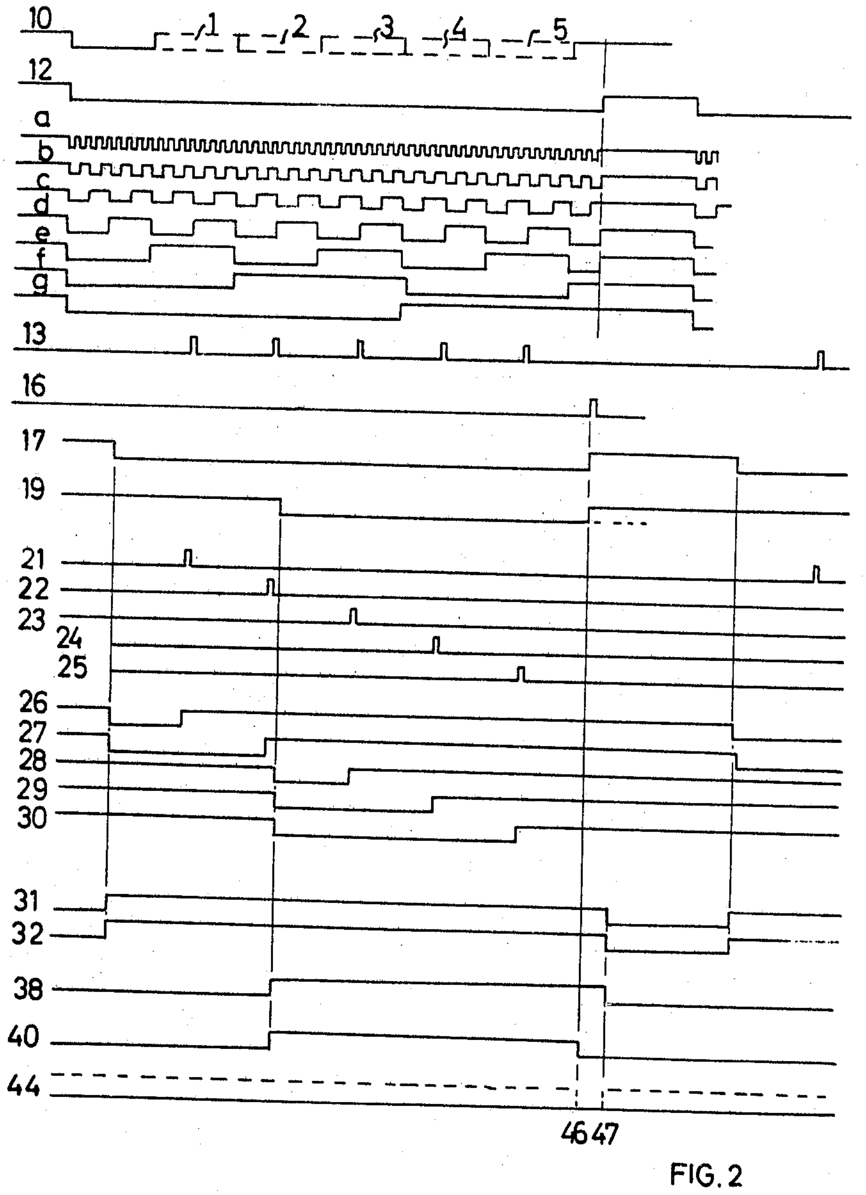
FIGURE 2 is the assembly of the operational diagrams of the transmitting equipment of the transmission device according to the invention.

In FIGURE 1, a relay coil 10 which actuates a contact 11 is fed with the pulses of a pulse train according to the international teleprinter code appearing at the output of any teleprinter transmitting the international five-unit code. In FIGURE 2, the pulses flowing through coil 10 are illustrated as a function of time by the broken line, illustrating the amplitude of the current flowing through the contact 11 (FIGURE 1). Contact 11 remains closed during the waiting period of the transmission device. The transmission of a pulse train according to the international five-unit code is preceded by a time interval in which contact 11 is opened. During each of the following time intervals 1, 2, 3, 4, 5 (FIGURE 2) contact 11 is opened or closed dependent on the telegraphic sign to be transmitted and the code used. To take this fact into account, the broken line is replaced, at the location of intervals 1, 2, 3, 4, 5, by two dotted lines illustrating, in each interval, the two possibilities: absence or presence of current in contact 11.

The current flowing through contact 11 on the one hand energizes a flip-flop 12, and on the other hand is brought to the input of an AND circuit 13. If, after a rest period of the transmission device, the contact 11 opens to indicate the transmission of a pulse train, the interruption of the current triggers the flip-flop 12, the output voltage of which causes cut-in of a timing mechanism constituted by a counter 14 permanently fed by a rectangular-wave generator 15 of predetermined constant frequency and controlled for reset by a coincidence circuit 16. In this instance, counter 14 is a binary counter constituted, for instance, by several circuits such as circuit *a* illustrated in FIGURE 5.

Figure 5:
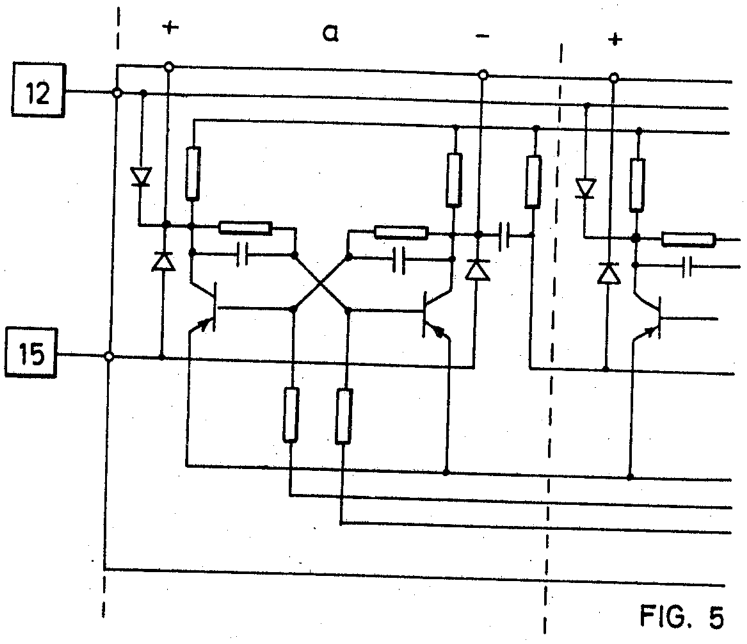
FIGURES 5 to 8 are detail circuit diagrams.
Figure 6:
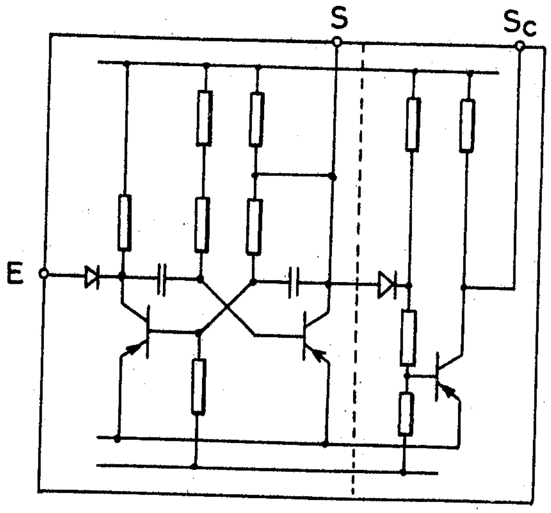
Figure 7:
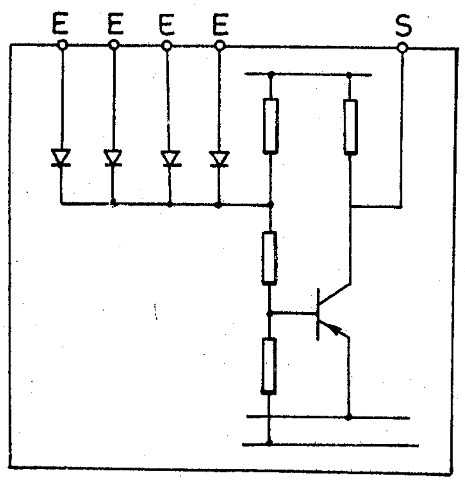

Counter 14 has seven signal circuits *a, b, c, d, e, f, g,* each circuit comprising two outputs, one supplying the signal while the other forms its complement, designated for instance by $+a$ and $-a$ for circuit *a* (FIGURE 5). In FIGURE 2, the signals $+a$, $+b$, $+c$, $+d$, $+e$, $+f$, $+g$, are illustrated as functions of time. Counter 14 is automatically stopped after the time necessary for the transmission of a pulse train representing a telegraphic sign of the international five-unit code, following the disappearance of the output voltage of the flip-flop 12 which causes a zero reset of all the circuits. The time necessary for the transmission is defined, in the present example, by means of an AND circuit or a coincidence circuit 16, sensitive to signals $-a$, $+b$, $-c$, $+d$, $+e$, $-f$, $-g$ and delivering an output voltage at the location of the fiftieth impulse of the signal $-a$. Circuit 16, as well as all the other AND circuits referred to here, may for instance be formed as illustrated in FIGURE 7 where E symbolizes a certain number of inputs and S the output. The output signal of the AND circuit 16 (line 16, FIGURE 2) is, on the one hand, brought to the input of the flip-flop 12 to bring it in a rest or stable state which, as explained above, causes counter 14 to stop and to be reset to zero and, on the other hand, the output signal is brought to the input of the two monostable flip-flops 17 and 18. The monostable flip-flops mentioned here may be made up as illustrated in FIGURE 6, for instance, where E stands for the input and S for the output. In certain cases, for instance in the case of flip-flop 18, a complementary output S*c* supplies a voltage when S does not supply any and inversely. The flip-flop 18 has two outputs 19 and 20 (S, and S*c* FIGURE 6) supplying the signal and its complement. The monostable flip-flops 17 and 18 form a further part of the timing mechanism 14, 15, 16 of the transmitting equipment of the transmission device and may obviously be replaced by other elements capable of providing the same results.

Figure 8:
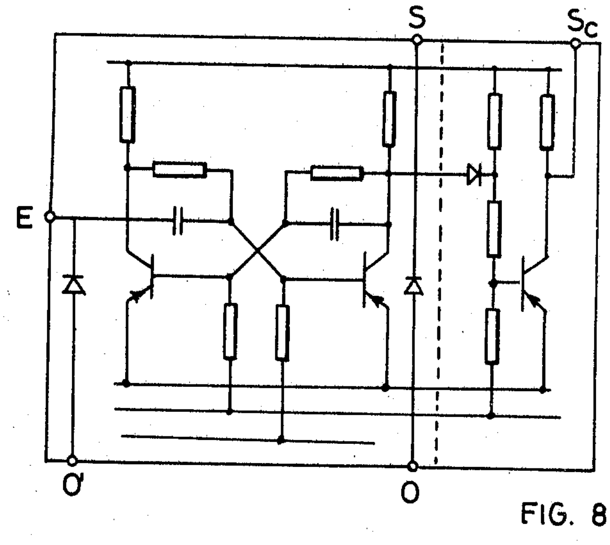

The AND circuit 13 cuts in only during certain brief intervals, determined by the counter 14, if contact 11 is closed at the same time. Thus circuit 13 delivers an output voltage only for those of intervals 1, 2, 3, 4, 5, during which contact 11 is closed, and, furthermore, if such is the case for all of these intervals, at the location only of the 12th, 20th, 28th, 36th and 44th pulse of signal $+a$ (line 13, FIGURE 2). The output signals of circuit 13 are brought to the input of five gate circuits, under the circumstances the AND circuits 21, 22, 23, 24, 25 of which during each interval 1, 2, 3, 4, 5 one only at the most may allow passage of a signal towards its output (lines 21 to 25, FIGURE 2). These five gate circuits are controlled by the timing mechanism to open one after the other, at the rhythm of signal $+e$ or $-e$ and, thus may be referred to as dispatching gates, allowing to direct the information transmitted by the contact 11 and the AND circuit 13 towards the memory device 26 during interval 1 and the readings carried out by the circuit AND 13 during the intervals 2, 3, 4, 5 respectively, towards the memory devices 27, 28, 29, 30. The output signals of the memories 26, 27, 28, 29, 30 depend on the opening or the closing of contact 11 during the intervals 1 to 5 and are illustrated as functions of time by lines 26, 27, 28, 29, 30 of FIGURE 2 for the particular case where contact 11 is always closed during these intervals. The memories or bistable circuits, mentioned herein, may for instance be made up by circuits such as illustrated in FIGURE 8 where E stands for the input 0 or 0′, the zero setting and S and S*c* an output respectively and a complementary output. Output S*c* is optional.

As in the example under consideration, only the memories 28, 29 and 30 are available in time to receive the information relative to the transmission of the next telegraphic sign, the memories 26 and 27 are each followed by a final memory 31 and 32 storing the information during the zero setting of the preceding memories 26 and 27.

The transfer of the information through the capacitors connecting these memories and the zero-setting are controlled after a predetermined period of time, defined by the appearance of a pulse across the output condenser when the monostable flip-flop 17 falls to its rest state. The length of time during which the monostable flip-flop 17 remains energized is selected in relation to the rest state after which the final memories 31 and 32 are again available.

An output signal appears at the output 19 (line 19, FIGURE 2) simultaneously with the appearance of the output signal of circuit AND 16 and triggering of the monostable flip-flop 18. The output signal appearing at the output 19 cuts-in a first code translator group 33 at the input of which the memories 28, 29 and 30 are connected. This first code translator group is made up in a manner known per se, for instance, according to U.S. Patent No. 2,771,506; it emits an oscillation selected between eight oscillations of different frequency generated in appropriate oscillation generators joined together in an assembly 34. To each of the eight possible combinations of the conditions of the memories 28, 29, 30 corresponds one of the eight oscillations. This oscillation is transmitted to a mixer 35 which, in the present case, is an AND circuit and thereafter to an output amplifier or a radio transmission equipment 36.

At the time when the flip-flop 18 comes to a state of rest, the disappearance of the signal at the output 19 cuts-out the code translator group 33. Simultaneously, an output signal, appearing at the output 20 and generating a pulse across the terminals of the condenser, triggers a monostable flip-flop 37 and sets the flip-flops 28, 29, 30 to zero so that they are ready to receive new information. Flip-flop 37 is made up as shown in FIGURE 6 and comprises two outputs 38 and 39 corresponding to outputs S and S*c* of FIGURE 6.

The output signal appearing at the output 20 of the flip-flop 18 and the output signal appearing at the output 38 of the flip-flop 37 are applied at the input of an AND circuit 40 the output signal of which cuts in a second code translator group 41. This second code translator group is also formed, for instance, as that described in U.S. Patent No. 2,771,506; it emits an oscillation selected among four oscillations of different frequencies generated in appropriate oscillation generators connected in an assembly 42. To each of the four possible combinations of the conditions of the memories 31 and 32 corresponds one of the four oscillations. The transmission of this oscillation also takes place through the mixer 35 and the output amplifier 36.

When the flip-flop 18 is energized, the output signal 20 disappears and cuts out the AND circuit 40 causing the transmission of the frequency transmitted by the code translator 41 to cease at the benefit of that transmitted by the code translator 33 controlled by the signal appearing at the output 19. If the flip-flop 18 remains at rest, the AND circuit 40 is cut out at the time where the monostable flip-flop 37 again comes to rest, after the time in which it is adjusted. In this latter case, the output signal 19 is absent; the translator 33 stays cut out but a signal appears at the output 39 of the monostable flip-flop 37. This case takes place when the transmission stops. The two outputs 20 and 39 are connected to the input of an AND circuit 43, the output of which controls a gate circuit 44 used for sending a rest frequency (line 44, FIGURE 2) generated in an oscillator 45. The sending of the rest frequency is achieved by the mixer 35 and the output amplifier 36.

When the broken line 11 (FIGURE 2) represents a train of pulses in the middle of the transmission, the rest frequency is never transmitted, because each time, before a signal appears at the output 39, the flip-flop 18 is energized again so that the signal disappears at the output 20.

On the other hand, when the broken line 11 (FIGURE 2) represents the first train of pulses at the beginning of the transmission, the rest frequency is sent until such time as for the first time he signal disappears at the output 20, or what is the same, until such time as for the first time a signal appears at the output 19, that is, at point 46 (FIGURE 2). If, on the contrary, the broken line (FIGURE 2) represents the last pulse train, at the end of the transmission, the rest frequency sets in when, after the last pulse delivered by the AND circuit 16 (line 16), the output signal 19 having disappeared without reappearing (broken line 19) at the time when the signal 38 disappears, therefore at point 47, sending a pulse through a condenser which sets the memories 31 and 32 to zero.

The signals leaving the output amplifier 36 may be transmitted on a telephone network either directly or thorugh carrier currents or may particularly be transmitted by a radio transmitter even under transmission conditions subjected to important disturbances and may thereafter be received in an appropriate receiving station.

Figure 3:
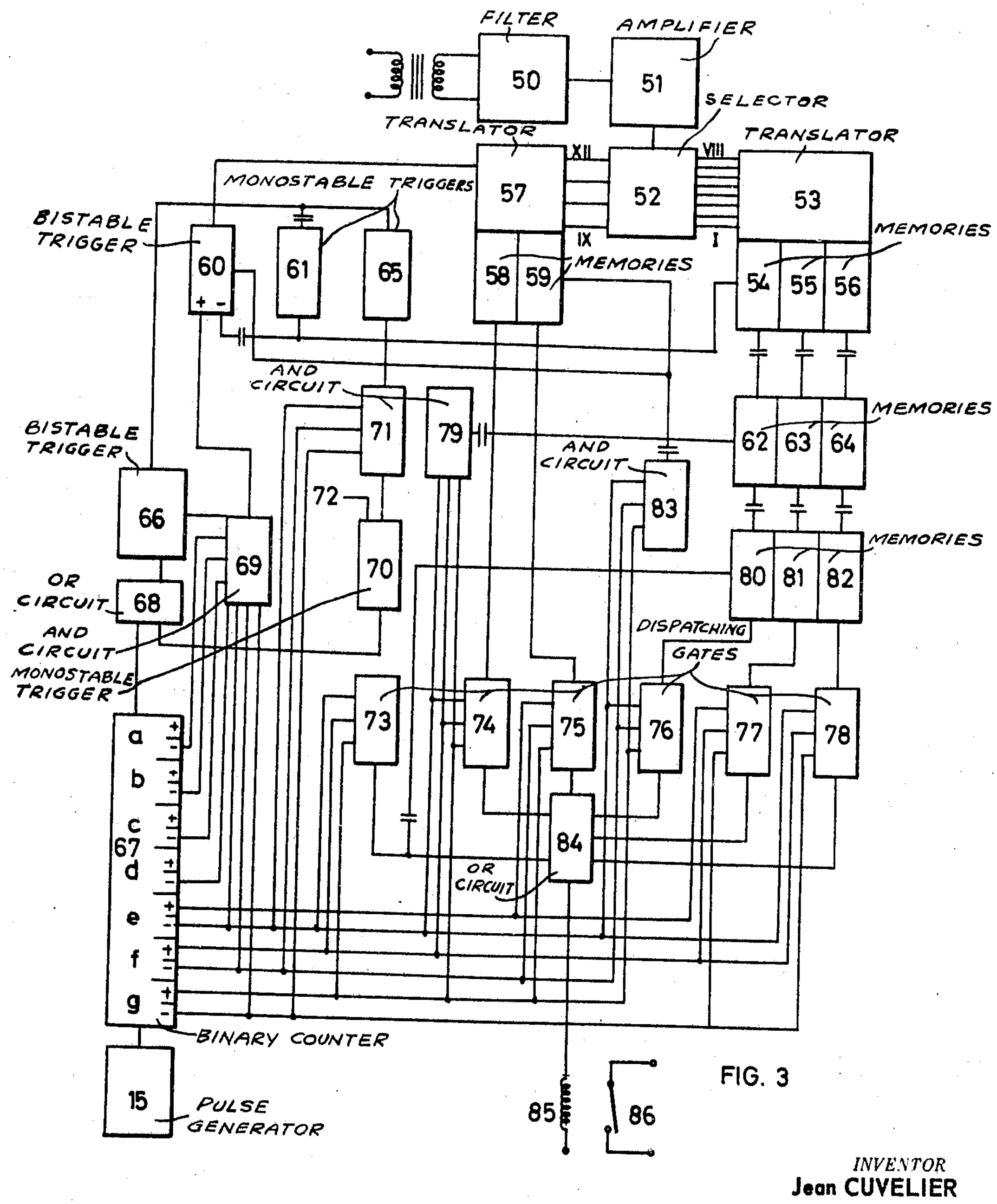
FIGURE 3 is a block diagram of the receiving equipment in accordance with the invention.

After eventual retransformation into low frequency oscillations, the latter are fed into a receiving equipment, for instance according to FIGURE 3. They are applied across the input of a limiter-amplifier filter 50 (line 50, FIGURE 4) and thereafter amplified in a power amplifier 51. The output signals of amplifier 51 can then energize, in an assembly 52, one of the selectors I to VIII and one of the selectors IX to XIII of 12 oscillation selectors having frequencies identical to those produced by the oscillation generators joined in the assemblies 34 to 42 of the transmission equipment. The generators as well as the selectors may, for instance, be well known vibrating blade generators and selectors. The output signal of the first group of selector (I to VIII) is introduced into the code translator 53, giving to each of the eight frequencies, a certain combination of energized or rest conditions of the three memories or bistable flip-flops 54, 55 and 56. The output signal of the second group of selectors (IX to XII) is introduced into the code translator 57, giving to each of the four frequencies a certain combination of the excited or rest conditions of two memories or bistable flip-flops 58 and 59.

Figure 4:
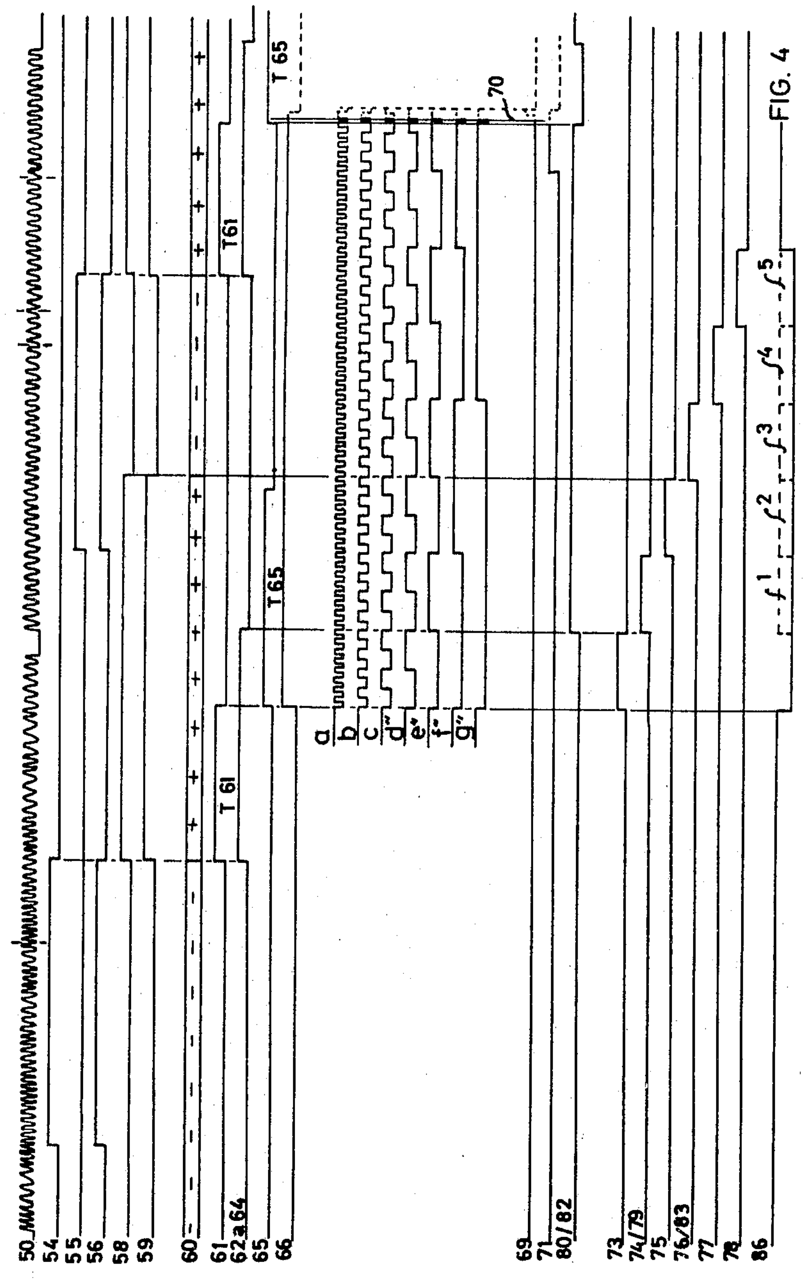
FIGURE 4 is the assembly of the operational diagrams of the receiving equipment of the transmission device.

When a frequency is recorded by the group of selectors IX to XII, a third bistable flip-flop 60 is energized. The bistable flip-flop 60 comprises two complementary outputs and may be referred to as part of a triggering circuit. To take these two complementary states into account, one is designated by "+", the other by "—" on FIGURE 4, band 60. The flip-flop 60 is set to zero or to the state of rest at the same time as flip-flops 58 and 59. When flip-flop 60 is energized, it generates a pulse through an output capacitor which, on the one hand, brings about triggering of a monostable flip-flop 61 and, on the other hand, the transfer of the information recorded on the flip-flops 54, 55, 56 towards three intermediate memories 62, 63, 64 also made up of flip-flops. It should be noted that memories 62, 63, 64 also made up of flip-flops. It should be noted that memories 54 to 59 trigger at the time when a corresponding oscillation is recorded by a selector of the assembly 52, but that the number of memories that trigger depends on the letter that is transmitted and he code that is used. This is illustrated in FIGURE 4, by lines 54, 55, 56 illustrating the particular case where first the state of flip-flops 54, 56 and 58, 59 changes and thereafter the state of flip-flops 55, 56, 58 and 59 changes (normally, every situation may arise; no flip-flops are energized in the situation where all flip-flops are energized). The band 60 "—" (FIGURE 4) illustrates the output state of the bistable flip-flop 60 connected to the monostable flip-flop 61 via a capacitor. When the monostable flip-flop 61 resumes its state of rest, its signal (line 61, FIGURE 4), transmitted through an output capacitor, first causes triggering of a monostable flip-flop 65 (line 64, FIGURE 4) and thereafter triggering of a bistable flip-flop 66.

When the flip-flop 66 is triggered, it delivers an output signal (line 66, FIGURE 4) cutting in counter 61. This output signal must go through an OR circuit 68 before being applied at the input of a counter 67. Counter 67 is permanently fed by the constant frequency square wave generator 15 which is part of the equipment of the same station. It should be noted here that normally each teleprinter station comprises transmitting and receiving equipment, certain parts of which may be used for both equipments, but the transmission and reception of information makes use of two different stations of which none of the elements are common. The constant frequency square wave generator 15 of the station receiving the information is therefore not the same as that of the station transmitting the information.

Counter 67 is formed in the same manner as counter 14 of the transmission equipment so that it is possible to use the same counter in the two equipments provided an appropriate switch is used. The output signals (FIGURE 4) of this counter are designated by *a* to *g* as for counter 14. Counter 67 is activated by the arrival of signal 60 "+" and is cut-out at the arrival of a stop signal (line 66, FIGURE 4) delivered by a coincidence device 69 at the location of the 63rd pulse of the signal $-a$ of counter 67, if the flip-flop 60 is in the state of rest. This takes place, for instance, at the end of a transmission. In FIGURE 4, the stop pulse 69 is drawn in a dotted line as are the other signals illustrating the situation at the end of the transmission.

During an uninterrupted transmission (normal lines, FIGURE 4) on the other hand, counter 67 is periodically stopped during a very short period of time (70, FIGURE 4), defined by a monostable circuit 70. The circuit 70 is energized by an output signal (line 71, FIGURE 4) of a coincidence device 71 actuated after the 51st and before the 64th pulse of the signal $-a$, simultaneously in the presence of an output signal of the monostable flip-flop 65 (line 65, FIGURE 4).

The monostable flip-flop 61 determine a delay $T_{61}$ when the flip-flop 66 is triggered, in relation to the time where a frequency of the group of frequencies IX to XII is recorded by the code translator 57. At delay $T_{61}$, introduced by the monostable flip-flop 61, another delay $T_{65}$ is added and introduced by the monostable flip-flop 65 to determine the moment when the coincidence device 71 is actuated. These delays $T_{61}$ and $T_{65}$ are subjected to certain criteria. If the mean duration for the transmission of a telegraphic sign is of 57 pulses of the signal $-a$ and if the time for response by the selectors 52 may vary at the maximum from zero to 24 pulses of the signal $-a$, $T_{65}$ is selected equal to the duration of 24 pulses of the wave $-a$ and $T_{61}$ is selected as equal to slightly more than half of $T_{65}$, for instance equal to 16 pulses of the wave $-a$. The advantages of this arrangement are explained following the description of the other parts of the equipment.

Flip-flop 66, although useful, is not indispensable. If it is removed, the output of the coincidence device 69 is applied to a second input 72 of the monostable flip-flop 70. The two inputs of the monostable flip-flop 70 then making up an OR circuit. Such a measure is particularly justifiable during a synchronized transmission.

The various outputs of the counter 67 are used to control the successive restitution of the pulses according to the five-unit international code. Namely, they make it possible to define six successive intervals for the control of six dispatching gate circuits or AND circuits: 73, 74, 75, 76, 77, 78 (lines 73 to 78, FIGURE 4). The circuits 74 and 75 form gates for the contents of memories 58 and 59 restituted in the first place to constitute the first two units of the five-unit code. A circuit AND 79 is parallelly connected to the AND circuit 74, AND circuit 79 being fed by the same outputs of counter 67 as those that feed the circuit 74. The signal transmitted through an output condenser of circuit 79 causes the transfer of the information contained in the intermediate memories 62, 63, 64 towards the three final memories 80, 81, 82 and the setting to zero of the memories 62, 63, 64 (lines 62 to 64, FIGURE 4). The circuits 76, 77, 78 form gates for the content of the memories 80, 81, 82 secondly restituted to constitute the three lasts units of the five-unit international code. An AND circuit 83 is arranged parallel to circuit 76, circuit 83 being fed by the same outputs of counter 67 as those applied to circuit 76. The signal transmitted through an output condenser of circuit 83 causes setting to zero of the memories 58 and 59, and also of the bistable flip-flop 60.

Circuit 73 determines the duration of the "start" signal that precedes the restitution of the five units of the international code and during which there is an absence of current. The triggering of this gate 73 generates a pulse which is transmitted through a condenser across the terminals of the zero setting (0, FIGURE 8) of the final memories 80, 81, 82 (FIGURE 4). The outputs of the gate circuits 73 to 78 are connected to the input of a mixer or OR circuit 84 the output of which discharges on a relay coil 85 actuated by a contact 86. Across the terminals of this contact, then appears the information in the form of a train of current pulses, (line 86, FIGURE 4) according to the five-unit pulse code, exactly as at the output of the teleprinter feeding the coil 10 in FIGURE 1 (line 10, FIGURE 2).

One of the advantages of the transmission according to the code of two frequencies among twelve frequencies, transmitted in two steps, is the high selectivity of the reception obtained, due to a relatively long period before registration of the frequency received by the selector 52. In view of this fact, in the case of a communication that is heavily disturbed, namely by fading, the reception of the information in the memories 54, 55, 56, 58 and 59 is not obtained in a regular sequence so that a certain picking up of this sequence is necessary. This picking up is possible due to the fact that the timing mechanism of the receiving equipment controls the restitution of the train of pulses according to the five-unit code at a variable sequence determined by the circuit 71, consistent not only with a prolonged duration of the "stop" signal, if the start of the cycle spreads, but also, due to delay $T_{61}$ forced upon the restitution, consistent with a duration of the "stop" signal shorter than at the transmission, because it is possible to start the restitution before the normal duration of a cycle has run off.

I claim:

1. A transmission device for teleprinters to transmit information in form of pulse trains by transforming the same into a frequency code transmitted in two steps, comprising:

(a) a timing mechanism generating various timing pulses;

(b) a trigger circuit sensitive to the starting pulse of each pulse train representing a telegraphic sign adapted to cut in and to reset the timing mechanism;

(c) a plurality of dispatching gates connected to the incoming pulse train and controlled by the timing mechanism, the number of dispatching gates being the same as the number of significant pulses in said pulse train;

(d) first memories connected to the outputs of one part of the dispatching gates controlled by delayed timing pulses;

(e) second memories connected to the other part of the dispatching gates controlled by further delayed timing pulses;

(f) final memories controlled by still further delayed timing pulses connected to said first memories;

(g) first and second translators connected to said second memories and to said final memories respectively, at the output of said first and second translators appearing respectively one oscillation out of a first and one oscillation out of a second group of frequencies; and (h) a mixing and output circuit connected to the output of said translators and adapted to feed a transmitting equipment.

2. A transmission device according to claim 1, whereing the sum of the time delay between the timing pulses controlling said final memories and the timing pulses controlling said second memories and the time delay between the timing pulses controlling said second memories and said first memories is less than the time interval between the start of two successive pulse trains representing two consecutive telegraphic signs but is longer than the duration of an entire pulse train.

3. A transmission device according to claim 1, wherein the timing mechanism comprises a rectangular signal generator, a binary counter having a plurality of outputs connected to said rectangular signal generator, and a plurality of monostable flip-flops connected to one or more outputs of the binary counter, the output of said monostable flip-flops defining predetermined time delays, said outputs of the binary counter and of the flip-flops delivering the various timing pulses.

4. A transmission device according to claim 1, further comprising an oscillator generating a rest frequency, a gate controlled by said timing mechanism and connected to said oscillator, the output of the gate being fed into said mixing and output circuit.

5. A transmission device for teleprinters to transmit information in the form of pulse trains by transforming the same into a frequency code transmitted in two steps, as regards transmission, and after reception to reconstitute the information in the form of pulse trains, wherein on the receiving side the information is received according to the frequency code transmitted in two steps comprising:

(a) a receiving circuit adapted to receive oscillations in a predetermined range of frequencies;

(b) an oscillation selector connected to the receiving circuit having as many outputs as there are frequencies to be received;

(c) first and second translators each one connected to a different series of outputs of the oscillation selector;

(d) a timing mechanism generating various timing pulses;

(e) a triggering circuit connected to said translator sensitive to the recording of a frequency in said second translator and having outputs for cutting in said timing mechanism and having control inputs for being reset by timing pulses;

(f) first and second memories connected respectively to the outputs of said first and second translators and end memories connected to said first memories, said first memories being controlled by said triggering circuit and said second and end memories being controlled by timing pulses;

(g) a dispatching gate connected to each one of said second and end memories and controlled by appropriate timing pulses controlling the delivery time of the contents of said second and end memories; and (h) an output circuit connected to the dispatching gates for reconstituting said pulse trains.

6. A transmission device according to claim 5, comprising further intermediate memories controlled by timing pulses and connected between the first and end memories.

7. A transmission device according to claim 5, wherein the timing mechanism comprises a rectangular signal generator and a binary counter having a plurality of outputs for generating the various timing pulses connected to said rectangular signal generator.

8. A transmission device according to claim 5, wherein the triggering circuit comprises a bistable trigger connected to an output of said second translator and controlled by a timing pulse, the output of this bistable trigger being fed to a monostable trigger for delaying cut in of the timing mechanism.

9. A transmission device according to claim 8, wherein the triggering circuit comprises a second bistable trigger connected to said monostable trigger for cut in of the timing mechanism and controlled by a timing pulse for reset.

10. A transmission device according to claim 5, further comprising an OR circuit connected to the timing mechanism, the inputs of the OR circuit being connected to said triggering circuit and to a further monostable trigger delaying new cut in after reset of the timing mechanism by a timing pulse delivered after a time slightly shorter than the normal duration of a pulse train.

References Cited

UNITED STATES PATENTS

| | | | |
|---|---|---|---|
| 2,771,506 | 11/1956 | Coquelet | 178—26.5 |
| 2,847,503 | 8/1958 | Diamond et al. | 178—26.5 |
| 2,894,067 | 7/1959 | Hausman | 178—26.5 |
| 3,005,871 | 10/1961 | Rudolph | 178—26.5 |

THOMAS A. ROBINSON, Primary Examiner

U.S. Cl. X.R.

178—17.5